Dec. 27, 1938. M. L. WARNER 2,142,019
HOLDER
Filed Jan. 6, 1937
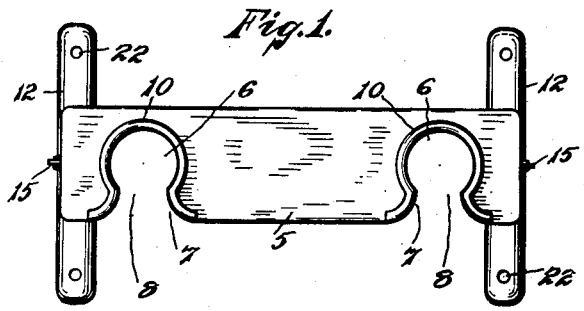
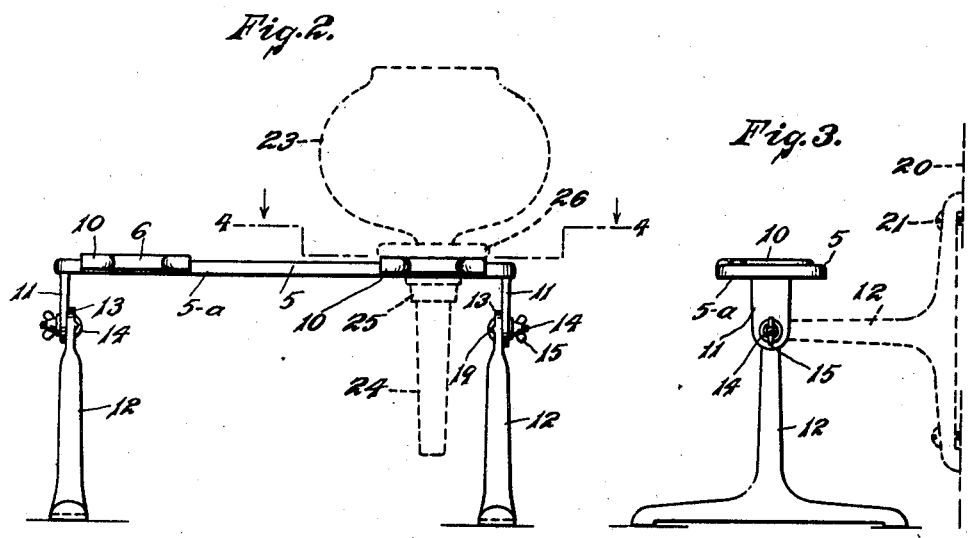
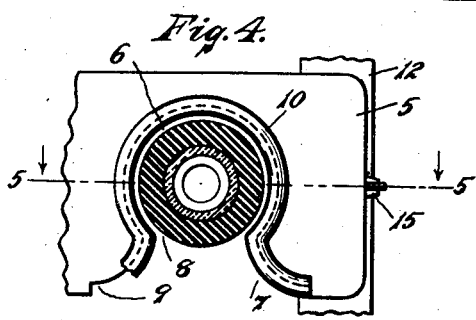
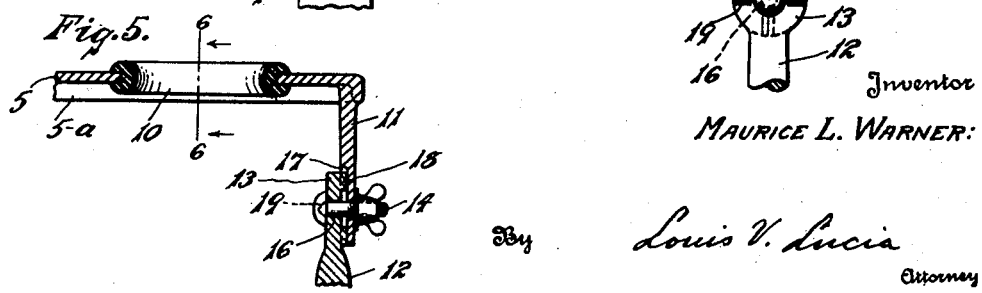
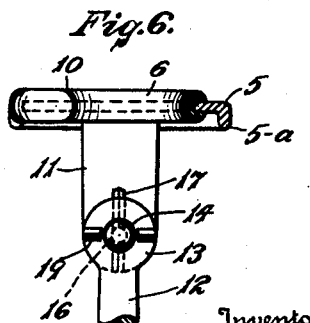
Inventor
MAURICE L. WARNER:
By Louis V. Lucia
Attorney Patented Dec. 27, 1938

2,142,019

UNITED STATES PATENT OFFICE 2,142,019

HOLDER

Maurice L. Warner, Hartford, Conn., assignor to The Silex Company, Hartford, Conn., a corporation of Connecticut Application January 6, 1937, Serial No. 119,272

4 Claims. (Cl. 248—312)

This invention relates to holders and particularly to holders which are especially adapted for supporting articles of glass.

An object of this invention, among others, is to provide a holder affording certain advantages in the use thereof for supporting the glass bowls of coffee makers of the vacuum type.

A further object of the invention is to provide such a holder which will securely retain an article which is supported thereon in such a manner that it will not become accidentally disengaged and fall off of the said holder and thereby become broken.

Further objects will be clearly understood from the following description and the drawing in which:—

Figure 1 is a plan view, in elevation, of a holder embodying my invention.

Figure 2 is a front view of the same, in elevation, and showing a coffee maker bowl in supported position thereon.

Figure 3 is an end view of the holder, in elevation, and illustrating the manner in which the same may be hung on a wall.

Figure 4 is a fragmentary plan view on an enlarged scale on line 4—4 of Figure 2, showing parts thereof broken away and illustrating the manner in which the glass bowl is positioned therein.

Figure 5 is a front view, in section, on line 5—5 of Figure 4.

Figure 6 is an end view, in section, on line 6—6 of Figure 5.

As illustrated in the drawing, my improved holder comprises a plate 5 having a skirt 5a along the edges thereof. The said plate is provided with openings or notches 6—6 of a size and shape suitable to receive an article to be supported upon said holder.

Each of the said openings is formed with a flared mouth portion 7 leading into said opening through a throat 8 of a size less than that of the opening.

The edges of the opening, forming the mouth thereof, are indented in the front edge of the said plate 5 as indicated at 9 in Figure 4. Guards of rubber, or other suitable material, are mounted upon the edges of the opening and mouth portions thereof in order to protect an article, that is to be supported on said holder, against damage from coming into contact with said edges as it is being inserted into said opening. The said guards 10—10 are slit along their outer edge to enclose the free edges as clearly illustrated in Figure 5.

The plate 5 is provided with depending projections 11—11 whereby the said plate may be mounted upon inverted T-shaped legs having a flattened portion 13; each of said legs being attached to one of said projections by means of a bolt 14 and nut 15; the said bolt extending through an aperture 16 in the flat portion 13 of the leg and a similar aperture in the projection.

Each of the said projections are provided with a vertical groove 17 intersecting the apertures 16 therein and the flat portion of each of the legs is provided with a boss 18 upon one side thereof and a similar boss 19 upon its opposite side which extends crosswise to the said boss 18. The said bosses are disposed with their axis intersecting the opening 16 and, therefore, one of the bosses 18 or 19, depending on the position of the plate relative to the legs, will engage with the groove 17 to prevent turning movement between the plate 5 and the legs when the said legs are connected to the projections by means of the screws 14 and nuts 15.

When it is desired to mount the said holder upon a wall, as illustrated in Figure 3 of the drawing, the said legs 12—12 may be secured to the projections 11—11, at right angles thereto, by simply reversing the said legs so that the bosses 19, instead of the bosses 18, will engage the groove 17. When in this position, the said legs will form a bracket whereby the said holder may be hung on the wall, indicated at 20, by means of screws 21 which extend through apertures 22 in the feet at opposite sides of said legs.

In the form above described, my improved holder is especially adapted for use in supporting glass coffee maker bowls such as 23, illustrated, in dotted lines in Figure 2 of the drawing, in position upon said holder. The said bowls usually comprise a stem 24 upon which is mounted a collar 25 having a flange 26.

As may be clearly seen from the illustration, each of the openings 6, with its mouth 7 and throat 8, is so formed that when it is desired to mount a glass bowl, such as illustrated, to be supported thereon, the stem portion 24 of the bowl may be first entered into the opening, in a horizontal direction, through the throat 8 thereof. The bowl is then lowered upon the holder so that the collar 25 will rest within the main portion of the opening 6 with the flange 26 of said collar resting upon the edge of the opening or upon the guard 10 over said edge.

It will be clearly seen, from the illustration in Figure 4, that the said collar 25 is larger in diameter than the throat 8 of the opening 6 and that, while the same will fit within the said opening, it will not pass through the throat thereof in a lateral direction. Therefore, when the bowl is supported upon said holder, it is also retained against lateral disengagement therefrom. The said bowl may be readily disengaged from the holder, however, by simply lifting it to a position where the collar 25 is above the holder and withdrawing the bowl by passing the stem 24 thereof through the throat 8 of the opening.

While I have shown and described one form of a holder embodying my invention, it is to be understood that the same may be modified to a greater or lesser extent and that the openings therein may be made of various shapes and sizes to adapt the said holder to the particular use for which it is desired without departing from the scope of the appended claims.

I claim:

1. A holder of the character described comprising a plate having an opening adapted to receive by lateral insertion an article to be supported thereon; the edges of said opening being formed to provide a flared mouth and a reduced throat portion leading into said opening, and a grooved resilient guard mounted upon said plate and having the free edge of said opening engaged in the groove thereof to prevent contact with said edge by said article.

2. A holder of the character described comprising a plate having an opening adapted to receive an article, projections integral with and extending from said plate, and leg members secured to said projections and angularly adjustable thereon.

3. A holder of the character described comprising an apertured plate adapted to support an article thereon, projections integral with and extending downwardly from said plate, leg portions adjustably secured to said projections and feet extending from opposite sides of said leg portions for supporting said plate upon a surface.

4. A holder of the character described comprising a horizontally disposed plate having a notch extending inwardly from an edge thereof, a grooved resilient guard member mounted upon the free edge of said plate forming said notch and having the said edge engaged in the groove thereof, a depending projection at each end of said plate and a member comprising a foot mounted to each of said projections for supporting said plate.

MAURICE L. WARNER.